United States Patent
Koh (10) Patent No.: US 7,275,003 B2
(45) Date of Patent: Sep. 25, 2007

(54) HARMONIC DIAGNOSING METHOD FOR ELECTRIC FACILITY

(75) Inventor: Hiroshi Koh, Kyoto (JP)

(73) Assignee: ATEC Co. Ltd., Kyoto (JP)

( * ) Notice: Subject to any disclaimer, the term of this patent is extended or adjusted under 35 U.S.C. 154(b) by 0 days.

(21) Appl. No.: 10/525,227

(22) PCT Filed: Feb. 4, 2004

(86) PCT No.: PCT/JP2004/001154

§ 371 (c)(1),
(2), (4) Date: Feb. 22, 2005

(87) PCT Pub. No.: WO2004/070402

PCT Pub. Date: Aug. 19, 2004

(65) Prior Publication Data

US 2006/0009932 A1    Jan. 12, 2006

(30) Foreign Application Priority Data

Feb. 7, 2003 (JP) .............................. 2003-30807
Feb. 14, 2003 (JP) .............................. 2003-36362

(51) Int. Cl.
G01R 25/00 (2006.01)
(52) U.S. Cl. .................... 702/65; 702/38; 702/76; 324/522; 324/772
(58) Field of Classification Search ............ 702/33–36, 702/38, 57–59, 64–66, 75–77, 182–185; 324/519, 522, 545, 546, 772; 340/648; 318/490
See application file for complete search history.

(56) References Cited

U.S. PATENT DOCUMENTS 5,739,698 A * 4/1998 Bowers et al. ............... 324/772

FOREIGN PATENT DOCUMENTS

| JP | 11-083686 | 3/1999 |
| JP | 2002-189064 | 7/2002 |
| JP | 2003-075516 | 3/2003 |

* cited by examiner

Primary Examiner—John Barlow
Assistant Examiner—Manuel L Barbee
(74) Attorney, Agent, or Firm—Baker & Hostetler LLP (57) ABSTRACT

The present invention relates to a method of diagnosing deterioration by comparing an index value which is obtained by dividing the relative harmonic content of each order of the current harmonics flowing into an electric motor and inverter by the total harmonic distortion of the current harmonics up to the predetermined order, with a criteria value which is obtained by multiplying a harmonic function of each order formed of the index value by a calculated value for diagnosis of each order found through calculation from the relative harmonic content of each order. In the method, the degrees of deterioration of the electric motor and inverter are distinguished from each other by weighting the criteria value, and the deteriorated part is determined by a specific harmonic order of the current harmonics.

6 Claims, 7 Drawing Sheets

HARMONIC DIAGNOSING METHOD FOR ELECTRIC FACILITY

CROSS REFERENCE TO RELATED APPLICATIONS

This application claims priority to International Application No. PCT/JP2004/001154, filed Feb. 4, 2004, entitled HARMONIC DIAGNOSING METHOD FOR ELECTRIC FACILITY, which claims priority to Japanese Patent Application No. 2003-36362, filed Feb. 14, 2003, entitled METHOD OF HARMONIC DIAGNOSIS FOR ELECTRIC EQUIPMENT, which claims priority to Japanese Patent Application No. 2003-30807, filed on Feb. 7, 2003, entitled METHOD OF HARMONIC DIAGNOSIS FOR ELECTRIC EQUIPMENT, all of the above disclosures are incorporated herein by reference in their entirety.

BACKGROUND OF THE INVENTION

1. Field of the Invention

The present invention belongs to the technical field of electric equipment diagnosis, and relates to a method of harmonic diagnosis for electric equipment such as motors and inverters.

2. Description of the Related Art

Recent electric equipment has been tried to improve its productivity by a continuous and integrated production process. Furthermore, an energy saving device such as an inverter has been introduced together with a high-performing automated system in a wide range so as to achieve highly reliable equipment. Such mass production is being required in every industrial field.

Mass production equipment is generally operated continuously, and a breakdown (stoppage) in electric equipment often brings the entire process into a standstill. Once there is a breakdown, it not only damages production process but also loses the reliability of users, and may even cause a disaster. Thus, the downtime loss is immeasurable, and may lead to a fatal problem.

When they purchase brand new equipment (machine) and check it, enterprises perform the checking by making sure that the equipment (machine) operates according to its specification because at present there is no checking standards or unified rules. However, since recent automatic devices (machinery) have a combined system structure in which a lot of devices are connected via interface cables, there might be no matching between these systems, thus causing a lot of troubles later, or even fire accidents.

Furthermore, transportation equipment such as railroad trains and elevators to carry people are obliged to have a periodic inspection by statute; however, power conversion equipment (AC-AC converter) including motor equipment and inverters are checked only for the presence or absence of a temperature rise or abnormal noise, leaving safety problems unsolved.

The objects of diagnosing abnormalities and deterioration of the electric equipment include: to improve operation rate by reducing the downtime of the equipment; to reduce maintenance costs including material and labor costs; to reduce other costs by extending the replacement period and reducing the inspection maintenance; to prevent troubles; and to improve safety, reliability, productivity and quality.

Described above are the background and objects of the necessity of diagnosing abnormalities and deterioration of electric equipment. The conventional way of diagnosing abnormalities and deterioration in electric motors and inverters according to the present invention will be described in brief in the following sections 1 and 2.

1. Diagnosis of Abnormalities and Deterioration for Electric Motors

Methods of diagnosing abnormalities and deterioration for electric motors include: (1) vibration methods; (2) acoustic methods; (3) temperature methods; (4) torque methods; (5) current methods; and (6) waveform methods. Of these methods, vibration methods, which are the most frequently used methods, will be described as follows. The other diagnosing methods are omitted patents filed by the inventor of the present invention (Japanese Patent Applications No. 2000-386603, No. 2001-265949, No. 2001-358718, and No. 2003-030807).

Vibration methods have a simple diagnosis and a precise diagnosis. In the simple diagnosis, an abnormality is determined by a vibration overall value of a rotary machine in an electric motor or load equipment including an electric motor by installing a vibration pickup of electrokinetic type, piezoelectric type or displacement type as close to the source of vibration as possible. In the precise diagnosis, the cause and location of an abnormality and deterioration are determined by the frequency analysis of vibration. These diagnoses are both restricted to mechanical elements such as bearings and rotary shafts.

As described above, for the simple diagnosis, some enterprises have their own standards to determine between abnormality and normality by a vibration overall value based on the accumulated data and experience. However, most other enterprises depend on the ISO standard, the JIS standard or the VDI standard (the standard of the association of German Engineers). These standards, however, provide only average evaluations, and cannot be applied to all rotary machines. For example, the ISO standard and the JIS standard have ISO-2372 and JIS-B0906, respectively.

When an abnormality is determined by the simple diagnosis, a precise diagnosis is required to determine the cause and location. In general, vibration signals generated from rotary machines are complicated, and are hardly simple. In order to obtain significant information from the signals to precisely determine the presence or absence of an abnormality, frequency analyses are most widely used. Applying a frequency analysis to a vibration signal makes it possible to determine the cause and location of the abnormality.

For the rotary machines including these electric motors, the relation between the cause of an abnormality and the number of vibration events is not accurate because it is obtained from the data accumulated over a long period.

2. Diagnosis of Abnormalities and Deterioration for Inverters

Inverters have the advantages of saving energy, and improving productivity and operability so as to contribute to the achievement of high-tech industrial machines of various kinds. Inverters are now essential devices in motor equipment, and their production amount is increasing year by year. The production amount of industrial inverters in Japan in the fiscal year of 1999 exceeded 1,800,000 (equivalent to about 100 billion yen) according to MITI (present METI) Current Survey of Production.

By the way, an inverter is formed of a lot of parts including electronic parts such as ICs, resistors, capacitors and transistors, and other parts such as cooling fans and relays. These components cannot be used permanently, and their durable years greatly depend on the operating environment. Almost all the electronic parts have operating lives in compliance with Arrhenius law (the rule of doubling for every 10° C.: operating life doubles for every 10° C. reduction in the ambient temperature), so the inverter needs a periodic inspection.

As a diagnosis of abnormalities and deterioration for inverters, the JEMA (Japan Electrical Manufacturers' Association) recommends a periodic inspection in their guidebook "An encouragement of Periodic Inspection of General-Purpose Inverter" to prevent potential troubles.

However, in a diagnosis of abnormalities and deterioration for an inverter, the determination of the cause and location of an abnormality and deterioration requires the inverter to be stopped or even decomposed so as to be checked by a specialist with a special measuring device. In reality, inverters are often used until they are down. During the periods, the inverters often cause deterioration in their functions such as energy saving function and protection function, and also cause abnormalities in their output properties. In addition, the inverters often adversely affect other devices, such as causing robot malfunction or electric motor trouble.

SUMMARY OF THE INVENTION

Of diagnoses of abnormalities and deterioration for electric motors and inverters, the vibration methods are most widely used for electric motors. Since its installation affects the precision of an electric motor, the pickup must be fixed near the source of vibration. In addition, the location of an abnormality and deterioration to be diagnosed is restricted to mechanical elements such as bearings and rotary shafts. Furthermore, the measurement takes time, and the diagnosis cost including the measuring device is expensive. For these reasons, this diagnosis method is used mainly for comparatively large-sized machines with high importance.

The description of the other diagnosis methods for electric motors is omitted. Unlike vibration methods, all these methods cannot determine the cause and location of an abnormality and deterioration, and above all, online survey systems, which can diagnose abnormal load only, are extremely expensive.

In addition, in a diagnosis of abnormalities and deterioration for an inverter, as described earlier, the determination of the cause and location of an abnormality and deterioration requires the inverter to be stopped or even decomposed so as to be checked by a specialist with a special measuring device. This is extremely troublesome, time consuming, and costly.

In order to diagnose deterioration for electric motors and inverters, the inventor of the present invention filed Japanese Patent Applications No. 2000-386603, No. 2001-265949 and No. 2001-358718 as new methods of determining the degrees of deterioration of electric motors and inverters and its cause and location by the size of a relative harmonic content in the current.

However, these harmonic diagnosis methods by the inventors of the present invention are absolute methods in which calculation is performed by previously acquiring the rated capacities, power source impedance, and load factor of electric motors and inverters, the parallel equivalent capacity of the load of other than these devices, the service voltage, the types of harmonic measures and the like. These are not necessarily simple methods, taking time for diagnosis. Furthermore, the relation between harmonics and the location of deterioration, that is, the deteriorated part is not clear.

The method of harmonic diagnosis for electric equipment such as electric motors and inverters according to the present invention can solve problems owned by the inventors' harmonic diagnosis that is based on the aforementioned absolute methods as follows.

In a method of diagnosing deterioration to determine an abnormality of an electric motor or an inverter from current harmonics which flow into the electric motor and inverter that form the electric equipment, deterioration is determined by comparing an index value which is obtained by dividing the relative harmonic content of each order of the current harmonics by the total harmonic distortion of the current harmonics up to the predetermined order, with a criteria value which is obtained by multiplying the harmonic function of each order formed of the index value by a calculated value for diagnosis of each order found through calculation from the relative harmonic content of each order. The degrees of deterioration of the electric motor and inverter are distinguished from each other by weighting the criteria value, and the deteriorated part is determined by a specific harmonic order of the current harmonics.

The harmonic diagnosis method for electric equipment according to the present invention is performed by measuring the current harmonics flowing into the electric motor and inverter, however, this method does not depend on the capacities of the electric motor or inverter. This method is also irrespective of power source impedance, load factor, the parallel equivalent capacity of the load of other than these devices, the service voltage, the types of harmonic measures and the like, thereby being an extremely simple diagnosis method.

Furthermore, the relation between the harmonics and the deteriorated part of the electric motor and inverter has been clarified by using a basis analytical method. Since it becomes possible to distinguish between the degrees of deterioration based on the basis analytical method, the method of harmonic diagnosis according to the present invention is extremely practical, with the potential of spreading to the industrial society.

DESCRIPTION OF THE PREFERRED EMBODIMENTS

The embodiment of the present invention will be described as follows with reference to drawings.

Figure 1:
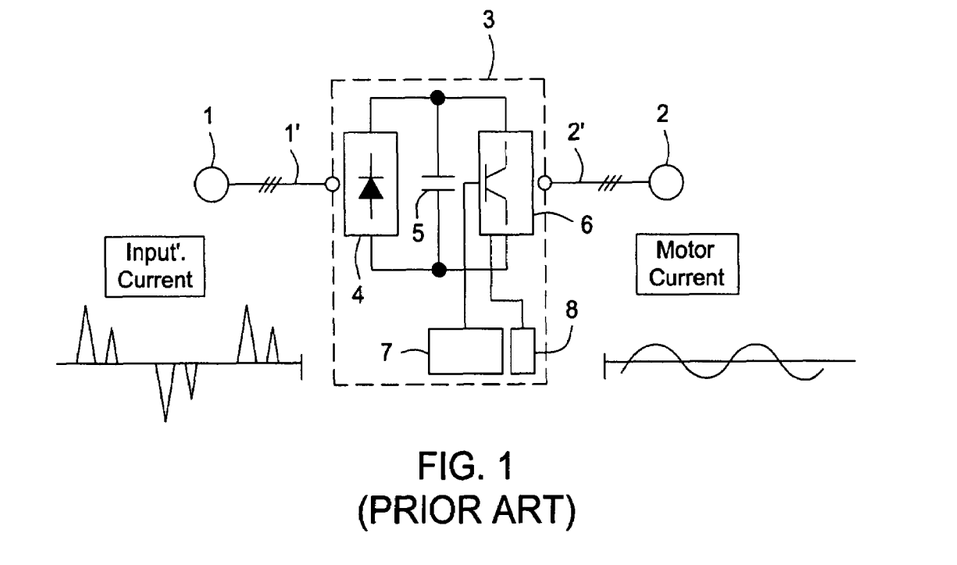
FIG. 1 is a block diagram of an inverter.

FIG. 1 is a block diagram of an inverter. The reference numeral 1 represents a three-phase AC power source, and input power 1' is flown to a converter part 4 of an AC-AC converter 3 which controls an electric motor 2. The reference numerals 5 and 6 represent a smoothing capacitor and an inverter part, respectively, and output power 2' is controlled by a control part 7 and a drive part 8. The control part 7 and the drive part 8 are a control board and a drive board, respectively, having electronic parts such as ICs, resistors, capacitors and transistors mounted on them. When the AC-AC converter 3 is based on a sinusoidal wave PWM technique, the input current and the electric motor current (output current) have the waveforms shown in FIG. 1.

The AC-AC converter 3 has the input current shown in FIG. 1 because of the presence of the smoothing capacitor 5 after the converter part 4 rectifies all the waves. This phenomenon will be described as follows.

Figure 2:
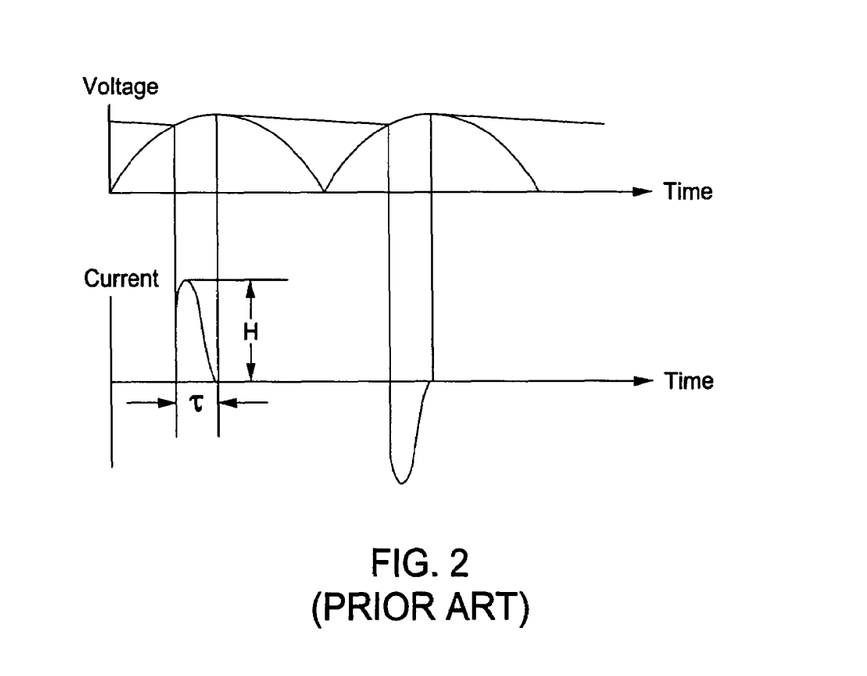
FIG. 2 is a view to explain the generation of harmonics.
Figure 3A:
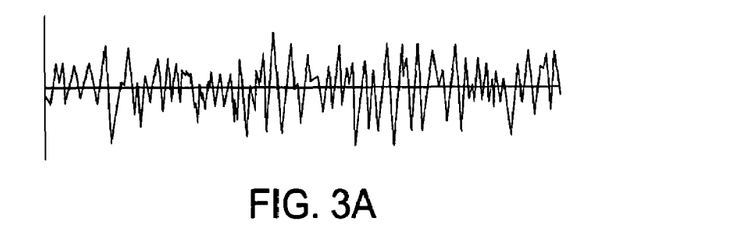
FIGS. 3A to 3H are examples of oscillating current waveforms, and autocorrelation functions corresponding to them.
Figure 3B:
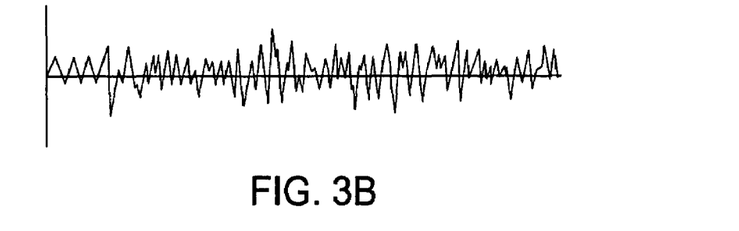
Figure 3C:
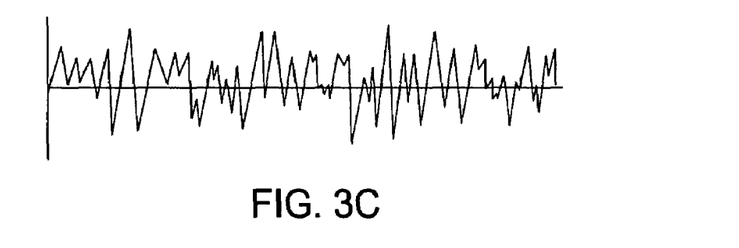
Figure 3D:
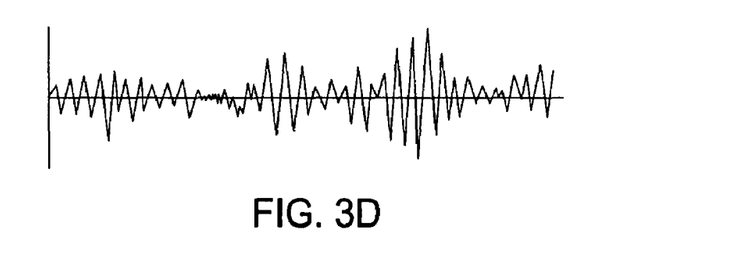
Figures 3E, 3F, 3G, 3H:
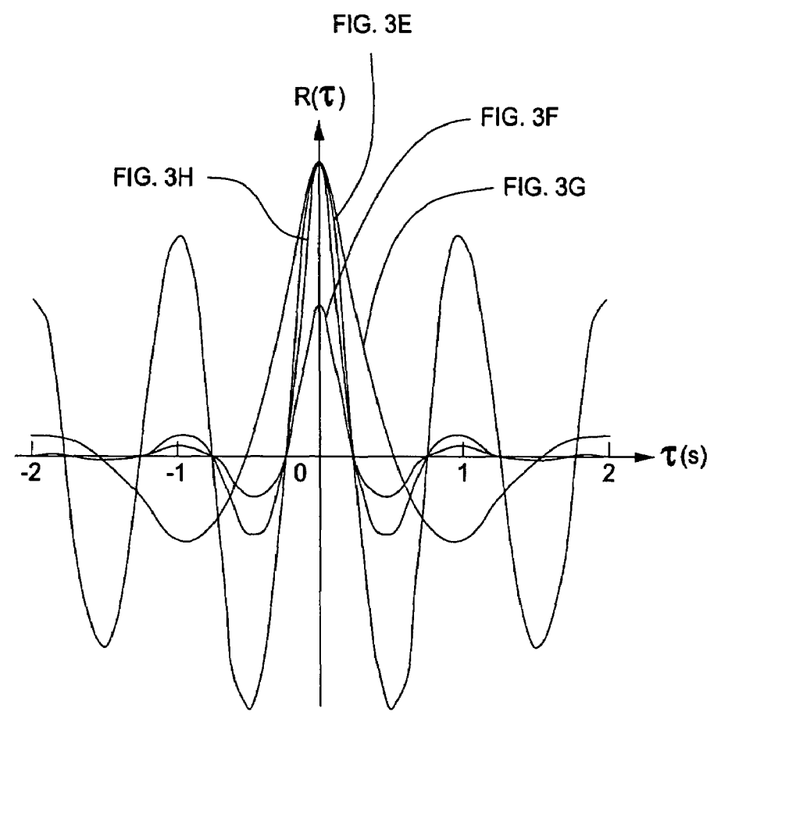

FIG. 2 shows examples of the generation of single-phase harmonics. Since the smoothing capacitor 5 shown in FIG. 1 is used to convert a three-phase AC power source into a DC power source, a pulse-like current as shown in FIG. 2 is flown to the capacitor 5 only during the charge. In the drawing, c represents a pulse width and H represents its height. The difference in flow between the AC power source and the DC power source generates harmonics.

By the way, when a sinusoidal current is supplied to the U phase, V phase and W phase of the electric motor, the magnetomotive forces $F_u$, $F_v$ and $F_w$ are respectively expressed by the following equations.

$$F_u = AI_u \sin \omega t[\cos \theta - (1/3)cid3\theta + (1/5)\cos 5\theta + \ldots]$$

$$F_v = AI_v \sin(\omega t - 120°)[\cos(\theta - 120°) - (1/3)\cos 3(\theta - 120°) + (1/5)\cos 5(\theta - 120°) + \ldots]$$

$$F_w = AI_w \sin(\omega t - 240°)[\cos(\theta - 240°) - (1/3)\cos 3(\theta - 240°) + (1/5)\cos 5(\theta - 240°) + \ldots] \quad \text{(Numerical Formula 1)}$$

The numerical formula 1 indicates a magnetomotive force at a distance of θ (electrical angle) on the circumference using the center of the magnetomotive force of the rotor as the base point. A represents a constant; $I_u$, $I_v$ and $I_w$ represent the effective values of the currents at the U phase, V phase and W phase, respectively; ω is an angular velocity expressed by 2nf (rad/s) when the frequency is f, and t represents time. Consequently, the synthesized magnetomotive force F in the case of taking the nth-order harmonics into consideration is as follows.

$$F = (3B/2) \; F_m(\sin(\theta - \omega t) + (K_{1,5}/5)\sin(5\theta + \omega t) + (K_{1,7}/7)\sin(7\theta - \omega t) + (K_{1,11}/11)\sin(11\theta + \omega t) + (K_{1,13}/13)\sin(13\theta - \omega t) + \ldots) \quad \text{(Numerical formula 2)}$$

where B represents a constant, $F_m$ represents the maximum value of the amplitude of the magnetomotive force of the fundamental wave, and $K_{1,n}$ represents a winding factor of the nth order harmonics.

The numerical formula 2 indicates the following.

(1) When $I_u = I_v = I_w$ harmonics such as n=3, 9, 15, . . . become zero.

(2) The harmonics such as n=5, 11, 17, . . . rotate at ω/n in the direction opposite to the fundamental wave.

(3) The harmonics such as n=7, 13, 19, . . . rotate at ω/n in the same direction as the fundamental wave.

On the other hand, let the current waveform shown in FIG. 2 be a square pulse wave, f(x) can be expressed by Fourier series in the following numerical formula.

(Numerical Formula 3)

$$f(x) = \sum_{n=1}^{\infty} (H/n\pi)(1 - \cos n\tau)\sin nx$$

where x=ωt(ω: angular velocity, t: time) and n represents the order of the harmonics. As apparent from the numerical formula 3, when the smoothing capacitor 5 is ideal, there is no flow of a pulse-like current resulting from a charge current, so that f(x)=0. With the deterioration of the smoothing capacitor 5, the capacitance decreases, and harmonic components having low orders such as n=5, 7 increase in the numerical formula 3. Note that n=3, or the 3rd harmonics are extremely small as is understood from the numerical formula 1 (zero in the case of $I_u = I_v = I_w$).

The relation between the current harmonics and the state of deterioration of the electric motor and inverter has been first clarified by the inventors of the present invention. The contents are as follows.

The electric motor is designed to contain as little harmonics as possible because it contains harmonic components in the magnetomotive force as shown in the numerical formula 2. Even so, the unbalance of power supply voltage and the like causes harmonics larger than a theoretical value. In addition, the inverter also generates harmonics as is well known.

The deteriorated part of the electric motor will be described as follows. The deteriorated part can be either a mechanical element such as a bearing and a rotary shaft or an electric element such as a stator winding. Particularly, when deterioration occurs in the mechanical element, the electric motor current contains an irregular vibrational component. It goes without saying that this includes regular harmonic components. Consequently, only the essential harmonic parts can be taken out from the random irregular current waveform by taking an autocorrelation function R (τ) shown in the following numerical formula.

(Numerical Formula 4)

$$R(\tau) = \lim_{T \to \infty} \frac{l}{T} \int_{-T/2}^{T/2} f(t) \cdot f(t + \tau) dt$$

where t: time, τ: $1/f_0$ ($f_0$ rotation frequency), T: time.

FIGS. 3A, 3B, 3C and 3D are examples of random current waveforms from which the fundamental wave components have been removed, and the autocorrelation functions corresponding to them are shown in FIGS. 3E, 3F, 3G and 3H, respectively. FIGS. 3A-3H indicate that when it is found that f changes at random every second by taking the autocorrelation function, R takes on a value only when τ=0, and becomes 0 in the other cases. Therefore, in case of the waveforms shown in FIGS. 3A, 3B, 3C and 3D, FIG. 3D has the highest correlation between the harmonics.

When deterioration occurs in an electric element such as a stator winding, changes in the magnetic flux inside the coil conductor causes an eddy current flowing like an eddy only inside the conductor. This eddy current induces local heating in the deteriorated part of a coil insulator, thereby causing unbalance between the respective phase currents. This results in $I_u \neq I_v \neq I_w$ in the numerical formula 1, with conspicuous 3rd-order harmonics. Furthermore, the 3rd-order harmonics repeat the phenomenon of further increasing the local heating in the deteriorated part.

On the other hand, about the deterioration of the inverter, the smoothing capacitor 5 shown in FIG. 1 has been described above. When the other electric elements (the converter part 4 and the inverter part 6), the control part 7, and the drive part 8 are deteriorated, the harmonic components increases in the current of the output power 2' shown in FIG. 1, thus exhibiting an extraordinary value. The inventors have found that the deterioration of the inverter and the deterioration of the electric motor are related to a plurality of specific harmonics. The following is a description about determination of such deterioration.

Figure 4:
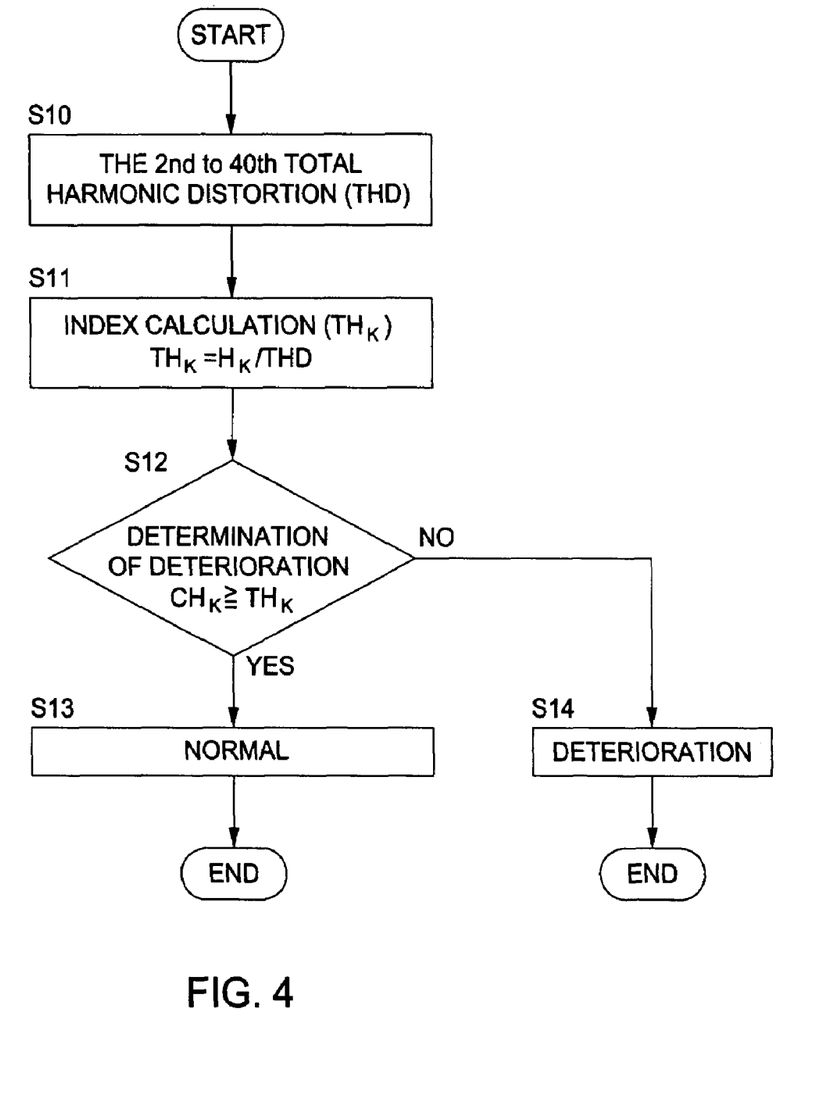
FIG. 4 is a flowchart to diagnose the electric motor.

FIG. 4 is a flowchart to diagnose the electric motor. Step S10 finds the total harmonic distortion (THD) of the harmonics contained in the current of the output power 2' shown in FIG. 1. The detection of the current harmonics can be done by using a well-known device such as a clamping measure or a non-contact electromagnetic field measure with a search coil. The harmonic orders from which to find the total harmonic distortion can be, for example, the 2nd to 40th orders. Step S11 performs index calculation to find an index value ($TH_k$) obtained by dividing the relative harmonic content of each order by the total harmonic distortion found at Step S10.

Figure 5A:
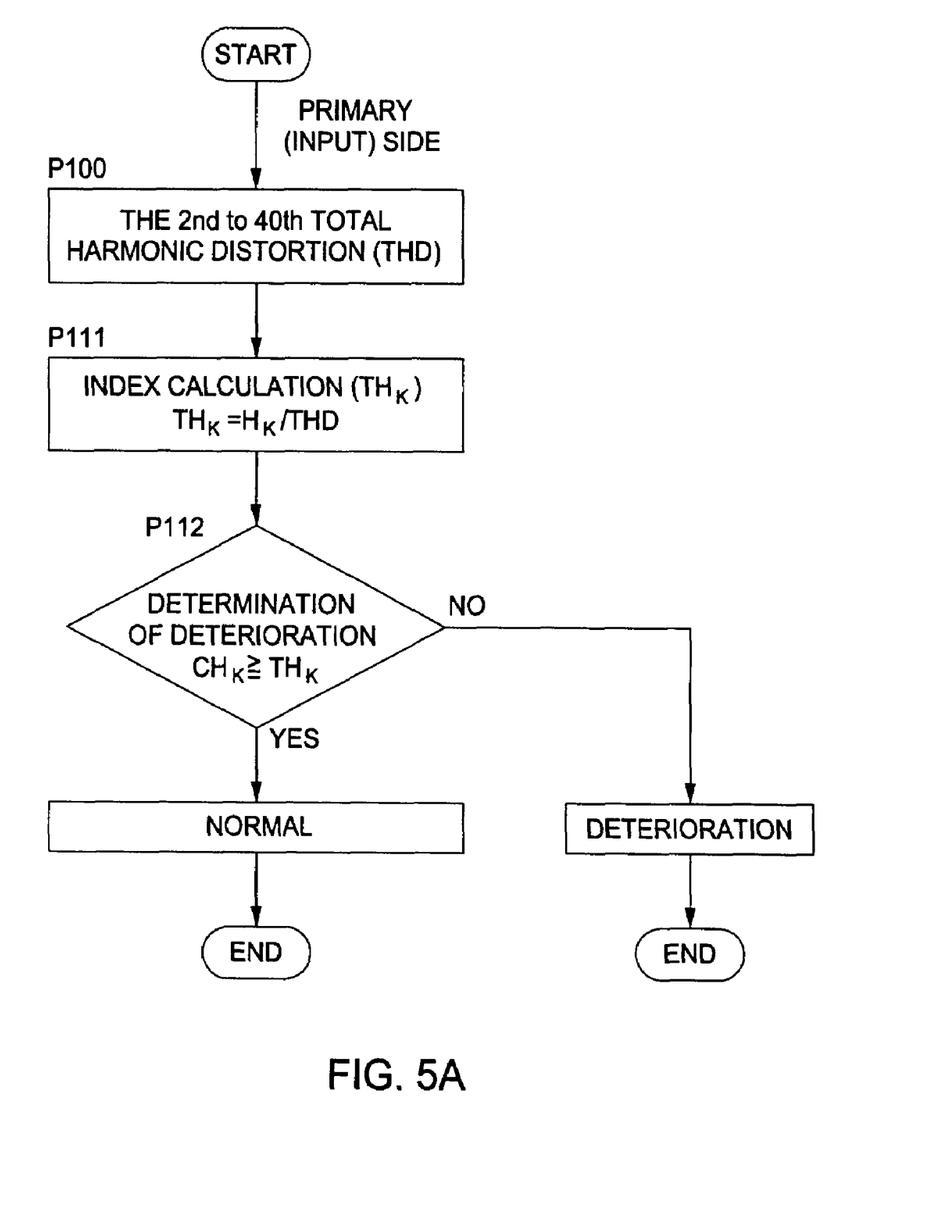
FIGS. 5A to 5C are flowcharts to diagnose the inverter.
Figure 5B:
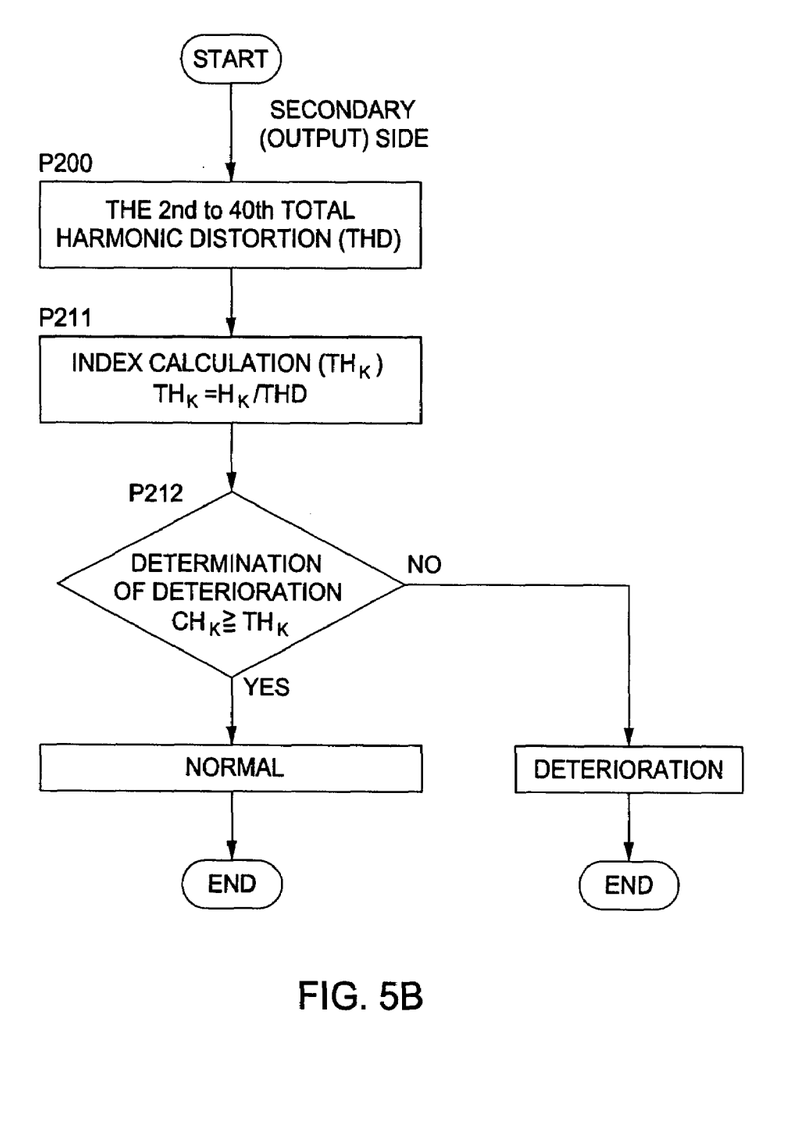
Figure 5C:
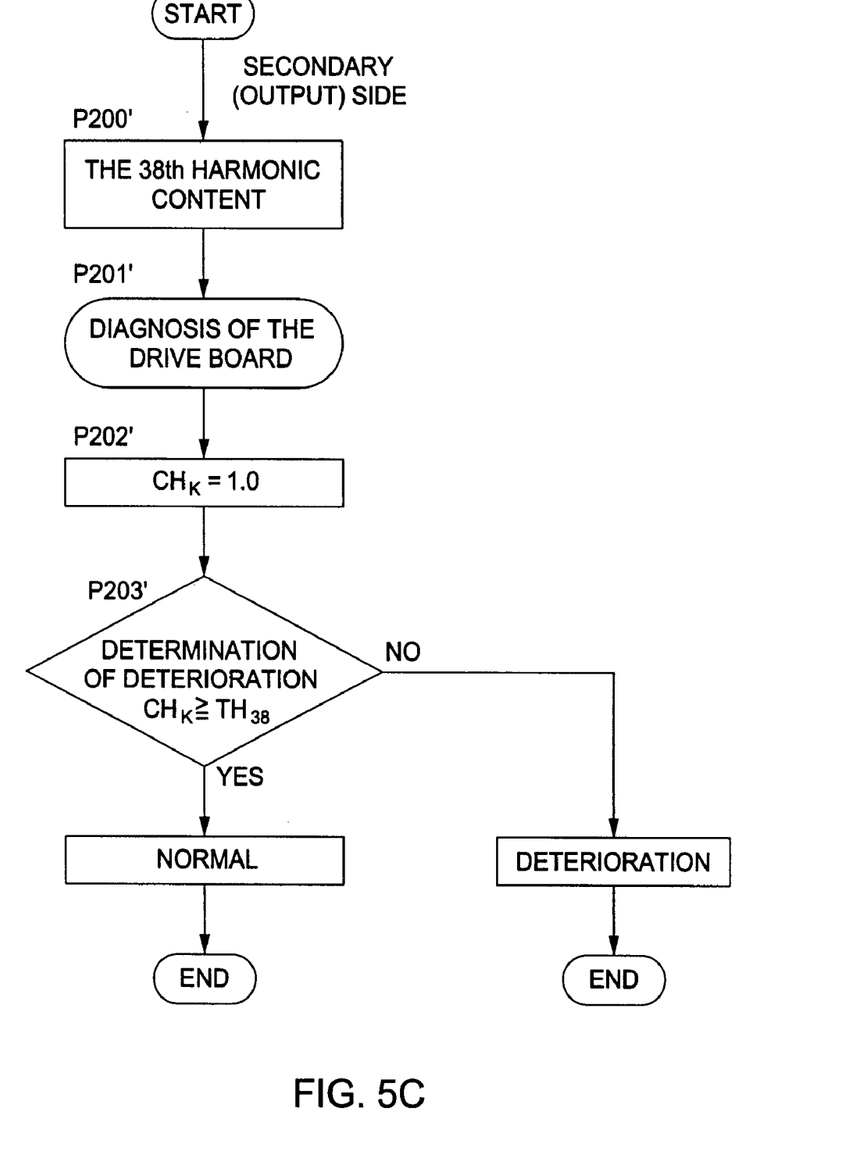

Then, the process goes to step S12 to determine deterioration. $CH_k$ is a criteria value of the Kth-order harmonics which will be described later, and is compared with $TH_k$ found at Step S11. As a result, the process goes to Step S13 when the electric motor is in the normal condition, and to step S14 when it is deteriorated. The flowchart to diagnose the inverter is shown in FIGS. 5A to 5C. FIG. 5A is a flowchart to diagnose the smoothing capacitor 5 shown in FIG. 1, and determines deterioration by measuring the current harmonics of the input power 1' shown in FIG. 1. Steps P100, P111 and P112 have the same calculation contents as in the Steps S10, S11, and 512 shown in FIG. 4.

FIG. 5B is a flowchart to diagnose the converter part 4, the inverter part 6 and the control part 7 shown in FIG. 1, and determines deterioration by measuring the current harmonics of the output power 2' shown in FIG. 1. Steps P200, P211 and P212 have the same calculation contents as in the Steps P100, P111, and P112 shown in FIG. 5A.

FIG. 5C is a flowchart to diagnose the drive part 8 shown in FIG. 1, and determines deterioration by measuring the current harmonics of the output power 2' shown in FIG. 1. At Step P200', the 38th-order harmonic content is found, and the drive board is diagnosed (Step P201'). The diagnosis of the drive board is based on the criteria value $CH_k=1.0$ of the 38th-order harmonics (Step P202'). At Step P203', $CH_k$ is compared with the 38th-order harmonic content ($H_{38}$) to determine the good or bad of the drive board.

The criteria values $CH_k$ shown in FIG. 4 and FIGS. 5A, 5B and 5C are found as follows. K represents the Kth-order harmonics, and $C_k$ represents a calculated value for diagnosis of the Kth-order harmonics.

Concerning the electric motor:

$$CH_k = C_k \times f(M_k) \qquad \text{(Numerical formula 5)}$$

where $f(M_k)$ is the Kth-order harmonic function.

Concerning the inverter:

$$CH_k = C_k \times f(N_s)$$

$$CH_k = C_k \times f(N_c)$$

$$CH_k = C_k \times f(N_p)$$

$$CH_k = C_k \times f(N_d) \qquad \text{(Numerical formula 6)}$$

where $f(N_s)$, $f(N_c)$ and $f(N_p)$ are plurality of Kth-order harmonic functions, and $f(N_d)=1.0$ ($CH_k=1.0$ in this case only).

In the numerical formulas 5 and 6, $C_k$, $f(M_k)$, $f(N_s)$, $f(N_c)$ and $f(N_p)$ will be explained later in the embodiment.

The degrees of deterioration of the electric motor and inverter (hereinafter referred to as devices) are discriminated into: "normal"; "caution needed"; and "defective" in order to show the quality. These "normal", "caution needed", and "defective" are referred to as A, B and C, respectively for convenience. The level B "caution needed" is further discriminated into: light deterioration B1 (deterioration which will cause no problem in the operation for about a half year); intermediate deterioration B2 (deterioration which will allow about three month operation, but requires tendency control); and heavy deterioration B3 (deterioration which requires preparation for replacement or repair because of the high probability of defects in the devices) depending on the degree of deterioration of the devices.

Since the diagnosis and inspection period after deterioration depend on the environmental conditions such as the number of the operating hours of the devices, ambient temperature and ventilating condition, the aforementioned inspection period can be considered just as a guideline.

The aforementioned levels: A, B1, B2, B3 and C are distinguished from each other by multiplying a weighting factor by the aforementioned criteria value. This factor will be described later in the embodiment. A multivariate analysis technique is effective to perform an analysis by focusing on the relation between the current harmonics and the deteriorated part of the devices, so this technique will be described as follows. In order to analyze the relation between the characteristic values of multidimensional events in a case where there is no external criteria for determination previously given as in the diagnosis of deterioration for devices according to the present invention, the basis analytical method which is one of the multivariate analyses is the most suitable.

Since there are a lot of documents about the basis analytical method, the detailed description will be omitted. The following is a description about the relation between the current harmonics and the deteriorated part of each of the electric motor and the inverter by using the contribution rate of the basis analytical method. In the following description, the numbers inside the parentheses following the principal components indicate contribution rates. The principal components are shown in decreasing order of characteristic values (the distribution of principal component scores).

1. Electric Motor (1) Abnormalities of the rotary shaft and bearing (electric motor's main body) or defective installation of the electric motor. The four principal components found are: the 2nd-order harmonics (55), the 3rd-order harmonics (9), the 4th-order harmonics (16) and the 5th-order harmonics (6). The cumulative contribution rate of the employed principal components is 86%, thereby fully satisfying 60% or more of the values generally employed.

(2) Poor insulation of the stator winding (between phases and to the ground). The four principal components found are: the 2nd-order harmonics (7), the 3rd-order harmonics (61), the 4th-order harmonics (5) and the 5th-order harmonics (22). The cumulative contribution rate is 95%.

(3) Damages of the rolling bearing and housing (electric motor's main body). The four principal components found are: the 2nd-order harmonics (23), the 3rd-order harmonics (10), the 4th-order harmonics (41) and the 5th-order harmonics (8). The cumulative contribution rate is 82%.

(4) Unevenness of air gaps between the stator and the rotor (dirt adhesion and local overheat). The four principal components found are: the 2nd-order harmonics (6), the 3rd-order harmonics (20), the 4th-order harmonics (8) and the 5th-order harmonics (59). The cumulative contribution rate is 93%.

(5) Unbalance of the load-side rotary shaft or defective coupling with the load. The five principal components found are: the 6th-order harmonics (5), the 7th-order harmonics (53), the 8th-order harmonics (7), the 9th-order harmonics (11) and the 10th-order harmonics (15). The cumulative contribution rate is 91%.

(6) Damages of the load-side bearing or dirt adhesion to the load-side system (for example, a piping valve of the pump). The five principal components found are: the 6th-order harmonics (7), the 7th-order harmonics (29), the 8th-order harmonics (35), the 9th-order harmonics (13) and the 10th-order harmonics (11). The cumulative contribution rate is 95%.

(7) Abnormalities of the load-side rotary shaft (for example, bending of the shaft) or wornout of the load-side system (for example, the coupling between the piping of the pump and the valve). The five principal components found are: the 6th-order harmonics (5), the 7th-order harmonics (21), the 8th-order harmonics (25), the 9th-order harmonics (33) and the 10th-order harmonics (8). The cumulative contribution rate is 92%.

(8) Damages of the load-side wheel, clutch, V-belt or the like. The five principal components found are: the 6th-order harmonics (6), the 7th-order harmonics (23), the 8th-order harmonics (17), the 9th-order harmonics (15) and the 10th-order harmonics (30). The cumulative contribution rate is 93%.

2. Inverter (1) Deterioration of the smoothing capacitor

The current harmonics on the inverter input side are measured, and two principal components are found. The components found are the 5th-order harmonics (62) and the 7th-order harmonics (36), and the cumulative contribution rate is 98%.

(2) Abnormalities of the control board (in particular, deterioration of the electrolytic capacitor). The current harmonics on the inverter output side are measured, and six principal components are found. The components found are: the 11th-order harmonics (21), the 13th-order harmonics (17), the 17th-order harmonics (19), the 19th-order harmonics (13), the 23rd-order harmonics (11), and the 25th-order harmonics (15). The cumulative contribution rate is 96%.

(3) Deterioration of electric power elements (in particular, deterioration of an inverse transformation element).

The current harmonics on the inverter output side are measured, and sixteen principal components are found. The components found are: the 2nd-order harmonics (3), the 3rd-order harmonics (16), the 4th-order harmonics (2), the 5th-order harmonics (13), the 6th-order harmonics (2), the 7th-order harmonics (17), the 8th-order harmonics (2), the 9th-order harmonics (2), the 10th-order harmonics (2), the 11th-order harmonics (6), the 13th-order harmonics (4), the 17th-order harmonics (7), the 19th-order harmonics (5), the 23rd-order harmonics (5), the 25th-order harmonics (6), and the 38th-order harmonics (7). The cumulative contribution rate is 99%.

(4) Deterioration of the drive board (mainly deterioration of the capacitor). The current harmonics on the inverter output side are measured. Only one principal component is enough, and the found component is the 38th-order harmonics. The contribution rate is 89%.

In the aforementioned electric motor, in the case that it is operated without being controlled by the inverter, the current harmonics on its input side is measured, whereas in the case that it is controlled by the inverter, the current harmonics on its output side (the motor's input) is measured.

The description hereinbefore can be summarized in Tables 1 and 2 shown below.

TABLE 1

Electric motor equipment's deteriorated part and current harmonics

| Electric motor equipment | Electric motor equipment's deteriorated part | Current harmonics | | |
|---|---|---|---|---|
| | | First principle component | Selected principle components | |
| | | Order | Contribution rate (%) | Order (in decreasing order of score) | Cumulative contribution rate (%) |
| Motor's main body | Rotary shaft and bearing, installation | 2 | 55 | 2, 4, 3, 6 | 86 |
| | Insulation of stator winding (between phases or to the ground) | 3 | 61 | 3, 5, 2, 4 | 95 |
| | Damage of bearing and housing | 4 | 41 | 4, 2, 3, 5 | 82 |
| | Uneven air gaps (dirt adhesion, local overheat) | 5 | 59 | 5, 3, 4, 2 | 93 |
| Motor load | Unbalance of rotary shaft, coupling | 7 | 53 | 7, 10, 9, 8, 6 | 91 |
| | Damage of bearing, foreign matter adhesion | 8 | 35 | 8, 7, 9, 10, 6 | 95 |
| | Wornout of rotary shaft and coupling part | 9 | 33 | 9, 8, 7, 10, 6 | 92 |
| | Damage of wheel and belt system | 10 | 30 | 10, 7, 8, 9, 6 | 93 |

TABLE 2

Inverter equipment's deteriorated part and current harmonics

| Equipment | Inverter equipment's deteriorated part | Current harmonics | | | |
|---|---|---|---|---|---|
| | | First principle component | | Selected principle components | |
| | | Order | Contribution rate (%) | Order (in decreasing order of score) | Cumulative contribution rate (%) |
| Inverter | Smoothing capacitor | 5 | 62 | 5, 7 | 98 |
| | Control board | 11 | 21 | 11, 17, 13, 25, 19, 23 | 96 |
| | Electric power element | 7 | 17 | 7, 3, 5, 17, 38, 11, 25, 19, 23, 13, 2, 4, 6, 8, 9, 10 | 99 |
| | Drive board | 38 | 89 | 38 | 89 |

Note that the smoothing capacitor has harmonics on the inverter input side, and the others have harmonics on the inverter output side.

Embodiment

As the embodiment of the present invention, the calculated value for diagnosis and the Kth-order harmonic function which are necessary for the deterioration determination of the electric motor and inverter will be described as follows by taking up specific examples. However, the present invention is not limited to this embodiment. In the following description, $H_k$ is the Kth-order harmonic content.

(1) Diagnosis of the electric motor (diagnosis of the electric motor's main body). When K=2, 3, 4 or 5, $\Sigma$ takes K=2 to 5. The procedure to find $C_k$ is as follows.

$$M_o = (\Sigma H_k^2)^{1/2} \quad\quad 1$$

$$A_k = H_k/M_o \quad\quad 2$$

$$T_o = \Sigma A_k \quad\quad 3$$

$$C_k = A_k/T_o \quad\quad 4$$

On the other hand, $f(M_k)$ can be the following values. In the following numerical formulas, $I_k$ represents the index value of the kth-order harmonics.

$$f(M_2) = S_1 \times (\Sigma I_k - I_2^3)$$

$$f(M_3) = S_2 \times (\Sigma I_k - I_3^3)$$

$$f(M_4) = S_1 \times (\Sigma I_k - I_4)$$

$$f(M_5) = S_2 \times (\Sigma I_k - I_5^3)$$

In the case of the inverter-driven motor, $S_1 = S_2 = 1.0$, and in the case of the electric motor alone (no inverter), $S_1 = 1.15$ and $S_2 = 1.25$.

(2) Diagnosis of the electric motor (diagnosis of the electric motor load). When K=6, 7, 8, 9, or 10, $\Sigma$ takes K=6 to 10. The procedure to find $C_k$ is as follows.

$$M_o = (\Sigma H_k^2)^{1/2} \quad\quad 1$$

$$A_k = H_k/M_o \quad\quad 2$$

$$T_o = \Sigma A_k \quad\quad 3$$

$$C_k = A_k/T_o \quad\quad 4$$

On the other hand, $f(M_k)$ can be the following values. In the following numerical formulas, $I_k$ represents the index value of the kth-order harmonics.

$$f(M_7) = S_2 \times (\Sigma I_k - I_7^3)$$

$$f(M_8) = S_1 \times (\Sigma I_k - I_8)$$

$$f(M_9) = S_1 \times (\Sigma I_k - I_9)$$

$$f(M_{10}) = S_1 \times (\Sigma I_k = I_{10})$$

In the case of the inverter-driven motor, $S_1 = S_2 = 1.0$, and in the case of the electric motor alone (no inverter), $S_1 = 1.15$ and $S_2 = 1.25$.

(3.) Diagnosis of the inverter 3.1. Diagnosis of the smoothing capacitor. When K=5 or 7, $\Sigma$ takes K=5 to 7. The procedure to find $C_k$ is as follows.

$$M_o = (\Sigma H_k^2)^{1/2} \quad\quad 1$$

$$A_k = H_k/M_o \quad\quad 2$$

$$T_o = \Sigma A_k \quad\quad 3$$

$$C_k = A_k/T_o \quad\quad 4$$

On the other hand, $f(N_s)$ can be the following values. In the following numerical formula, $I_k$ represents the index value of the kth-order harmonics.

$$f(N_s) = \Sigma I_k$$

3.2 Diagnosis of the control board. When K=11, 13, 17, 19, 23, or 25, $\Sigma$ takes 11 to 25. The procedure to find $C_k$ is as follows.

$$M_o = (\Sigma H_k^2)^{1/2} \quad\quad 1$$

$$A_k = H_k/M_o \quad\quad 2$$

$$T_o = \Sigma A_k \quad\quad 3$$

$$C_k = A_k/T_o \quad\quad 4$$

On the other hand, $f(N_c)$ can be the following values. In the following numerical formula, $I_k$ represents the index value of the kth-order harmonics.

$f(N_c) = \Sigma I_k - I_k^2$: six function values of $f(N_c)_{11}$, $f(N_c)_{13}$, $f(N_c)_{17}$, $f(N_c)_{19}$, $f(N_c)_{23}$, and $f(N_c)_{25}$.

3.3. Diagnosis of the electric power elements. When K=2, 3, 4, 5, 6, 7, 8, 9, 10, 11, 13, 17, 19, 23, 25 or 38, $\Sigma$ takes 2 to 38. The procedure to find $C_k$ is as follows.

$$M_o = (\Sigma H_k^2)^{1/2} \quad\quad 1$$

$$A_k = H_k/M_o \quad\quad 2$$

$$T_o = \Sigma A_k \quad\quad 3$$

$$C_k = A_k/T_o \quad\quad 4$$

On the other hand, $f(N_p)$ can be the following values. In the following numerical formula, $I_k$ represents the index value of the kth-order harmonics.

$f(N_p) = \Sigma I_k - I_k^2$: sixteen function values of $f(N_p)_2$, $f(N_p)_3$, $f(N_p)_4$, $f(N_p)_5$, $f(N_p)_6$, $f(N_p)_7$, $f(N_p)_8$, $f(N_p)_9$, $f(N_p)_{10}$, $f(N_p)_{11}$, $f(N_p)_{13}$, $f(N_p)_{17}$, $f(N_p)_{19}$, $f(N_p)_{23}$, $f(N_p)_{25}$, and $f(N_p)_{38}$.

3.4. Diagnosis of the drive board. As mentioned earlier, the drive board is diagnosed only by the size of the 38th-order harmonic content as shown in FIG. 5C. Therefore, $C_k = 1.0$, and $f(N_d) = 1.0$.

Examples of the electric equipment's deteriorated part and the distinction between the degrees of deterioration (A, B1, B2, B3 and C) described in the embodiment of the present invention are shown in Tables 3 and 4 below.

TABLE 3

The electric motor's deteriorated part and the distinction between the degrees of deterioration

| Electric Motor equipment | Electric motor Equipment's deteriorated part | Normal (A) | Caution needed (B) | | | Defective (C) |
|---|---|---|---|---|---|---|
| | | | (B1) | (B2) | (B3) | |
| Electric motor's main body | Rotary shaft and bearing, installment | $C_2 \times f(M_2)$ | (A) × 1.3 | (B1) × 1.3 | (B2) × 1.2 | (B3) or more |
| | Insulation of stator winding (between phases or to the ground) | $C_3 \times f(M_3)$ | (A) × 1.3 | (B1) × 1.3 | (B2) × 1.2 | (B3) or more |
| | Damage of bearing and housing | $C_4 \times f(M_4)$ | (A) × 1.3 | (B1) × 1.3 | (B2) × 1.2 | (B3) or more |
| | Uneven air gaps (dirt adhesion, local overheat) | $C_5 \times f(M_5)$ | (A) × 1.3 | (B1) × 1.3 | (B2) × 1.2 | (B3) or more |
| Motor load | Unbalance of rotary shaft, coupling | $C_7 \times f(M_7)$ | (A) × 1.2 | (B1) × 1.2 | (B2) × 1.1 | (B3) or more |
| | Damage of bearing, foreign matter adhesion | $C_8 \times f(M_8)$ | (A) × 1.2 | (B1) × 1.2 | (B2) × 1.1 | (B3) or more |
| | Wornout of rotary shaft and coupling part | $C_9 \times f(M_9)$ | (A) × 1.2 | (B1) × 1.2 | (B2) × 1.1 | (B3) or more |
| | Damage of wheel and belt system | $C_{10} \times f(M_{10})$ | (A) × 1.2 | (B1) × 1.2 | (B2) × 1.1 | (B3) or more | where $C_k$: the calculated value for diagnosis of the Kth-order harmonics, $f(M_k)$: Kth-order harmonic function

TABLE 4

The inverter equipment's deteriorated part and the distinction between the degrees of deterioration

| Equipment | The inverter equipment's deteriorated part | Normal (A) | Caution needed (B) | | | Defective (C) |
|---|---|---|---|---|---|---|
| | | | (B1) | (B2) | (B3) | |
| Inverter | Smoothing capacitor | $C_K \times f(N_s)$ | (A) × 1.1 | (B1) × 1.1 | (B2) × 1.1 | (B3) or more |
| | Control board | $C_K \times f(N_c)$ | (A) × 1.3 | (B1) × 1.3 | (B2) × 1.2 | (B3) or more |
| | Electric power element | $C_K \times f(N_p)$ | (A) × 1.3 | (B2) × 1.3 | (B2) × 1.2 | (B3) or more |
| | Drive board | $C_K \times f(N_d)$ | (A) × 1.3 | (B1) × 1.3 | (B2) × 1.2 | (B3) or more | where $C_k$: the calculated value for diagnosis of the kth-order harmonics, $f(N_s, N_c, N_p, N_d)$: kth-order harmonic functions.

Note that the numbers in $C_k$ and $f(N_s, N_c, N_p, N_d)$ shown in Table 4 correspond to two smoothing capacitors, 6 control boards, 16 electric power elements, and one drive board. Consequently, for the distinction between the degrees of deterioration, the degrees of deterioration are found separately excluding the drive board and are averaged. For example, calculation is done with A=0, B1=1, B2=2, B3=3, and C=4 and average is taken (round off the decimals).

As described hereinbefore, measuring current harmonics can determine the deteriorated part of an electric motor or inverter of electric equipment, and also can distinguish between the degrees of deterioration.

What is claimed is:
1. A method of harmonic diagnosis for electric equipment to determine an abnormality of an electric motor or inverter from a current harmonic flowing to said electric motor and inverter that form electric equipment, comprising:
comparing an index value, which is obtained by dividing a relative harmonic content of each order of current harmonics by total harmonic distortion of the current harmonics up to a predetermined order, with a criteria value, which is obtained by multiplying a harmonic function of each order found through calculation from the relative harmonic content of each order, wherein
the degrees of deterioration of said electric motor and inverter are distinguished from each other by weighting said criteria value, and a deteriorated part is determined from a specific harmonic order of said current harmonics, used to prevent abnormality of the electric motor or inverter.

2. The method of harmonic diagnosis for electric equipment according to claim 1, wherein
the specific harmonic orders are at least one odd order and at least one even order.

3. The method of harmonic diagnosis for electric equipment according to claim 2, wherein
the at least one odd order includes odd orders and the at least one even order includes even orders and the odd orders and the even orders are the $2^{nd}$ order, the $3^{rd}$ order, the $4^{th}$ order, the $5^{th}$ order, the $6^{th}$ order, the $7^{th}$ order, the $8^{th}$ order, the $9^{th}$ order, the $10^{th}$ order, the $11^{th}$ order, the $13^{th}$ order, the $17^{th}$ order, the $19^{th}$ order, the $23^{rd}$ order, the $25^{th}$ order and the $38^{th}$ order.

4. The method of harmonic diagnosis for electric equipment according to claim 1, wherein
the degrees of deterioration are distinguished into "normal", "caution is needed" and "defective".

5. The method of harmonic diagnosis for electric equipment according to claim 4, wherein
the "caution is needed" is distinguished into light deterioration, intermediate deterioration, and heavy deterioration according to the degrees of deterioration of the device.

6. A method of harmonic diagnosis for electric equipment to determine an abnormality of an electric motor or inverter from a current harmonic flowing to said electric motor and inverter that form electric equipment, comprising:
comparing an index value, which is obtained by dividing a relative harmonic content of each order of current harmonics by total harmonic distortion of the current harmonics up to a predetermined order, with a criteria value, which is obtained by multiplying a harmonic function of each order found through calculation from the relative harmonic content of each order, wherein
the degrees of deterioration of said electric motor and inverter are distinguished from each other by weighting said criteria value, and a deteriorated part is determined from a specific harmonic order of said current harmonics, outputting to a user.

* * * * *